(12) United States Patent
Shiue et al.

(10) Patent No.: US 6,462,935 B1
(45) Date of Patent: Oct. 8, 2002

(54) REPLACEABLE FLOW-THROUGH CAPACITORS FOR REMOVING CHARGED SPECIES FROM LIQUIDS

(75) Inventors: Lih-Ren Shiue, Chun-Lin Hsiang; Chia-Chann Shiue, Lungtan Shiang; S-Yen Wang, Taishan Shiang Taipei County; Fei-Chen Hsieh, Shi Chiu; Chin-Hui Lee, Tubei; Wan-Ting Lo, Hsinchu; Yu-His Hsieh, Pushin Shiang, all of (TW)

(73) Assignee: Lih-Ren Shiue, Hsinchu (TW)

( * ) Notice: Subject to any disclaimer, the term of this patent is extended or adjusted under 35 U.S.C. 154(b) by 0 days.

(21) Appl. No.: 09/948,852

(22) Filed: Sep. 7, 2001

(51) Int. Cl.[7] .................................................. H01G 4/32
(52) U.S. Cl. ...................................... 361/511; 361/530
(58) Field of Search ................................ 361/502, 511, 361/512, 521, 530

(56) References Cited

U.S. PATENT DOCUMENTS 3,331,993 A * 7/1967 Brown et al. ................ 205/152
4,244,010 A * 1/1981 Lintott
6,208,503 B1 * 3/2001 Shimada et al. ............. 361/511
6,307,733 B1 * 10/2001 Maruyama et al. ......... 361/509

* cited by examiner

Primary Examiner—Anthony Dinkins
(74) Attorney, Agent, or Firm—J.C. Patents

(57) ABSTRACT

A free-standing flow-through capacitor (FTC) is constructed by concentrically winding two electrodes and two dividers into a hollow-center roll. A liquid-feeding pipe is inserted to the central opening for delivering fluids to the FTC. Nano-particles of hydrated iron compound with $Fe_3O_4$ as the main component or its composite powders are used as the active materials for the electrodes. With channels crated by the dividers assembled in the roll, fluids injected from the feed pipe are confined inside the FTC, and flow outwardly and transversely through the entire length of the electrodes. Under an application of a low DC voltage to the electrodes, charged species are adsorbed and removed from the treated liquids as soon as they are in contact with the electrodes. Capacitive deionization using FTC of the present invention is applicable to waste-streams reduction, water purification and desalination at low costs and easy operation.

18 Claims, 4 Drawing Sheets

REPLACEABLE FLOW-THROUGH CAPACITORS FOR REMOVING CHARGED SPECIES FROM LIQUIDS

BACKGROUND OF THE INVENTION

1. Field of the Invention

This invention relates generally to capacitive deionization (CDI) of liquids containing charged species, such as industrial waste streams, city sewage and seawater, etc. More particularly, this invention relates to replaceable flow-through capacitors (FTCs) for removing charge-carrying materials from inorganic and organic aqueous solutions.

Background of the Invention

Water is one of the most precious resources to human. It is appropriate to describe the importance of water as "water gives us life". About three-quarter of the earth surface is covered by water, 98% of which is salt water and the remaining 2% is fresh water. Most of the fresh water is trapped in polar ice caps leaving less than 1% be suitable for direct use. As population grows with increasing urbanization and industrialization. which augment water consumption and waste generation, many countries in the world are thus suffering from water scarcity and environmental pollution. According to a UN prediction, there will be 48 countries, accounting for 32% of the world population, lack of fresh water by the year 2025. Water is vital to both the quality of life and prosperity of economy. Contaminated water can impart illness to people and cost governments millions of dollars to clean the polluted sites. Without fresh water, the daily life and activities of human will be hampered. Providing sufficient sources of fresh water to their people may be the responsibility of governments, yet it is the obligation of people on this globe to conserve water use, to recover useful resources and to reduce pollution.

Desalination of seawater is likely the most economical way to produce fresh water. Seawater is free, unlimited and available all year long unaffected by weathers. Seawater also has the highest content of total dissolved solids (TDS) among all brackish waters. Furthermore, liquid wastes, whether organic or inorganic in nature, frequently contain charged species resulted from hydrolysis, decomposition, flocculation, biological or chemical reactions of solutes. The total amount of charged species in seawater and liquids are expressed as TDS in terms of ppm (parts per million). Whether in desalination or waste treatments, reduction of TDS or deionization is one of the major goals of a purification protocol which may include sedimentation, adsorption, filtration, ozonation, etc. The aforementioned processes are arranged at either upstream or downstream of deionization for pre-treating or post-treating feed liquids. TDS of feed liquids has to be reduced to a certain level of ppm for domestic consumption or industrial applications. Deionization may be achieved using some popular techniques such as ion-exchange, distillation, reverse osmosis (RO), and electrodialysis. In comparison, CDI is relatively new and less known to the general public. In choosing a deionization method, one has to consider the cost of materials and operation, permeate flux (or yield, as well as salt rejection rate.

Most ion-exchange resins for deionization are expensive synthesized materials, which will release relatively benign ions in exchange for toxic ions. With use, the resins will become saturated and require regeneration. Regeneration of ion-exchange resins demands the use of strong acids or strong bases, as well as a lot of rinsing water. Hence, ion-exchange is water-wasteful, and it generates secondary pollution from chemicals used for regeneration. In order to attain fresh water, heat must be invested to seawater or raw waters in a distillation pot. Ions are then left behind as sludge in the pot. Distillation is an energy intensive process requiring a large operation space, for example, an evaporation column of more than 100 m (>300 ft) tall is employed as taught in U.S. Pat. No. 4,636,283 issued to Nasser. Nevertheless, distillation is the most widely used method in the desalination of seawater in the world. Commercially, RO is the second most popular desalination technique. It uses membranes to extract fresh water from brackish waters, while ions are still present in the feed waters. RO depends on high pressure, e.g., 800–1200 psig, to force the permeate (pure water) to pass through the nano-pores of the membranes. High operation pressure and low permeate flux are two disadvantageous characters of RO. While a high operation pressure of RO means a high operation cost, a low permeate flux imparts low throughputs. Lastly, electrodialysis utilizes both a DC electric field and ion-permeable membranes for deionization. There are at least three compartments, i.e., anode, middle and cathode, in each electrodialysis unit. Brackish waters flow in the middle compartment, and ions are drawn to the anode or the cathode compartment by electrostatic attraction in conjunction with selective permeation of membranes. Both the electrodes and the membranes of electrodialysis are extremely costly for treating large quantity of liquids. In terms of pollution reduction, ions are not entrapped or collected in the membrane techniques such as RO and electrodialysis. Therefore, these techniques are merely for liquid purification methods rather than for pollution reduction. On the contrary, CDI is a technique that can perform purification and pollution reduction with high recycle rates of feed liquids.

While solid particles are easily removed by a filtering media, charged species can be effectively detained by an electric field. It is a natural phenomenon that ions respond swiftly and reversibly to an electrostatic attraction. Within liquids containing charged species, such electrostatic attraction is most conveniently created between two parallel conductive plates under an application of an electric current. As charged species flow through the charged plates, they are quickly adsorbed by the plates, resulting in the reduction of TDS. Such a method of desalination is named as capacitive deionization (CDI), and the setup for carrying CDI is known as flow-through capacitor (FTC). The application of FTC was published three decades ago by J. Newman et. al., in J. Electrochem Soc.: Electrochemical Technology, March 1971, Pages 510–517, entitled "Desalting by Means of Porous Carbon Electrodes". It is incorporated by reference herein. Three representative prior arts of CDI are cited here to examine their commercial perspective, they are U.S. Pat. No. 5,779,891 issued to Andelman, U.S. Pat. No. 5,858,199 to Hanak and U.S. Pat. No. 5,954,937 to Farmer. All three patents are also incorporated by reference herein. The '891 patent uses graphite foil as conductive backing and activated carbon as ion-adsorbing material to form electrodes by physical compression. No chemical bonding, which is more reliable in electric connection than physical compression, exists between the active material and the substrate. A gold compression contact is also used to bind the electrode leads and the wire leads, which are connected to a DC power supply. The inclusion of precious metal will economically prevent the FTC from becoming a consumer product. Furthermore, platinum or other catalytic metal is doped with the carbon electrodes in '891 patent for electrochemically destroying chlorinated hydrocarbons (CHCs). For a higher efficiency of detoxification, CHCs are better treated with ozone than electrolysis. In order to attain the shortest and the straightest flow path, holes arc cut on the electrodes of FTC in '891 patent for aligning with the perforation of the liquid-feeding pipe. Not only the adsorbing area is compromised, the specific orientation of the electrodes also complicates the manufacturing process, which again will increase the cost of the devices and impair the commercial merit of the product.

For the separation of ionic substances from liquids, the patent '199 utilizes a combination of an electric field and a compound centrifugal force or Coriolis force. Incorporating a mechanical rotator in the apparatus results in a high operation cost and is difficult to use. In addition to carbons, the '199 patent also proclaims the use of mixed metal oxides such as tantalum and ruthenium oxides as the active material for ions adsorption. The oxides are expensive and not suitable for treating a large quantity of liquids. An expensive, synthesized aerogel carbon is employed as the ion-adsorbing material in the '937 patent for desalting. Such a carbon material is prepared from the polycondensation of resorcinol with formaldehyde followed by super critical point drying in liquid $CO_2$ under a pressure as high as 900 psi, and a carbonization of the dried gel at 500–1200° C. The preparation of a single batch takes as long as 2 weeks to complete according to U.S. Pat. No. 4,997,904 issued to Pekala, which is incorporated by reference herein. The lengthy preparation in conjunction with high processing pressures and temperatures will impart high costs to the materials required for constructing the FTC. Furthermore, the '937 patent uses gaskets, bolts, nuts, end plates and multi pairs of electrode to assemble a multi-stage FTC. Such a complex arrangement of FTC is prone to leaks and lacks commercial viability. CDI is truly a viable technology for reducing the TDS of liquids. However, more research is needed identify economical materials for use in CDI and to identify FTC devices that provide n easy mass-production and a user-friendly operation for the technique to become an affordable commercial means for recycling used liquids and waste reduction, as well as or generating fresh water from seawater.

SUMMARY OF THE INVENTION

Removal of ions by CDI utilizes a common mechanism as energy storage in supercapacitors, (i.e. supercapacitors can store up to several thousands of farad (F) of charges). Both CDI and supercapacitors mainly depend on double layer capacitance (DLC), as first characterized by Helmholtz in 1879, for deionization or for energy storage. According to the instant invention, nanoparticles including ferrites, such as hydrated iron compound $Fe_xO_yH_z$, where $1.0 \leq x \leq 3.0$, $0.0 \leq y \leq 4.0$, and $0.0 \leq z \leq 1.03$, and the main component of the particles is the black magnetite ($Fe_3O_4$) are first synthesized. Thereafter, by means of roller coating, powder coating or electrophoretic deposition, the said nanoparticles are secured to suitable current collectors to form conformal, monolithic electrodes of FTC for waste treatments and desalination. Preparation of the hydrated powders uses inexpensive starting materials, and the manufacturing procedures are quick and simple. The ion-adsorbing materials of the present invention are thus economical.

FTC of the instant invention is constructed from concentrically winding two sheets of electrodes interposed with polymeric dividers into a hollow-center roll. The central opening provides an insertion of a perforated pipe for feeding liquids to the FTC, while the dividers perform three tasks: 1) providing an insulation to the electrodes, 2) confining fluids within the FTC, and 3) creating a transverse flow of fluids inside the capacitor. Under the driving force of a peristatic pump, liquids flow freely, horizontally and outwardly through the entire length of electrodes before leaving the capacitor. Ions, thereby, have the highest opportunity to contact all accessible surface areas of the electrodes for adsorption. Not only the quantity of active materials used to fabricate the electrodes is minimum, both fabrications of the electrodes and the capacitors can be easily automated. The FTCs production hence becomes affordable consumer products for liquid purification and desalination. As known to those skilled in the art, the capacitors can be completely regenerated under a flushing with a clean solvent coupled with a quick reversion of the polarity of electrodes. Moreover, the FTC of the present invention is inexpensive; thus, it is dispensable. The capacitor can also be replaced and disposed when regeneration appears ineffective in restoring the deionization capability. Both the ion-adsorbing materials and the current collector of the replaceable FTC of the present invention are recyclable and environment friendly.

Just like the commercial packages of adsorbing/filtering carbons, ion-exchange resins and RO membranes, which are normally in a compact form for easy replacement, the FTC of the present invention is designed in a free-standing configuration. Such a FTC can be placed in a housing holder equipped with input and output ports for liquids, two electric leads for connection to a power source, and a cap with gaskets for hermetic sealing. All components of the housing holder can be precisely fabricated by injection molding. Replacement of a used FTC with a new one is as easy as changing battery for a flashlight. As soon as the FTC is placed in the housing holder, a liquid feeding pipe is inserted to the center of FTC roll, electrode leads are connected to the electric pins atop the holder cap using snap-on connectors, then the holder is sealed by hand tightening the threaded cap. It takes less than one minute to complete the restoration of a CDI treating unit without using any tool. CDI can be operated by a DC power at as low as 0.5 Volt and 100 mA, which can be easily provided by batteries, solar cells and fuel cells. Comparing to distillation, RO and electrodialysis, power consumption of CDI is much lower. Low DC voltages are needed only to retain charged species on the electrode surface, whereas chemical reactions or electrolysis should be avoided for they are detrimental to energy efficiency and the lifetime of electrodes. Electricity is used instead of chemicals for regenerating the electrodes of FTC, therefore no secondary pollution is produced. Nevertheless, precious ions such as $Au^{3+}$ and $Pd^{2+}$ can be collected, concentrated, and converted to useful forms using the CDI technique.

Being compact, light and battery-operational, CDI is truly a mobile desalting technique for liquid purification and desalination. In addition to easy incorporation of CDI with an existing waste-liquids treatment system, the instant invention further offers economical ion-adsorbing materials and user-friendly FTC package.

It is to be understood that both the foregoing general description and the following detailed description are exemplary, and are intended to provide further explanation of the invention as claimed.

BRIEF DESCRIPTIONS OF THE DRAWINGS

The advantages of the present invention, together with its realization, may be better understood by referring to the following description taken in conjunction with the accompanying drawings. In the drawings. like reference numbers generally refer to the same components viewed from different angles. The drawings illustrate the embodiments of the invention and, together with the description, serve mainly to elucidate the principles of the present invention.

Figure 5A:
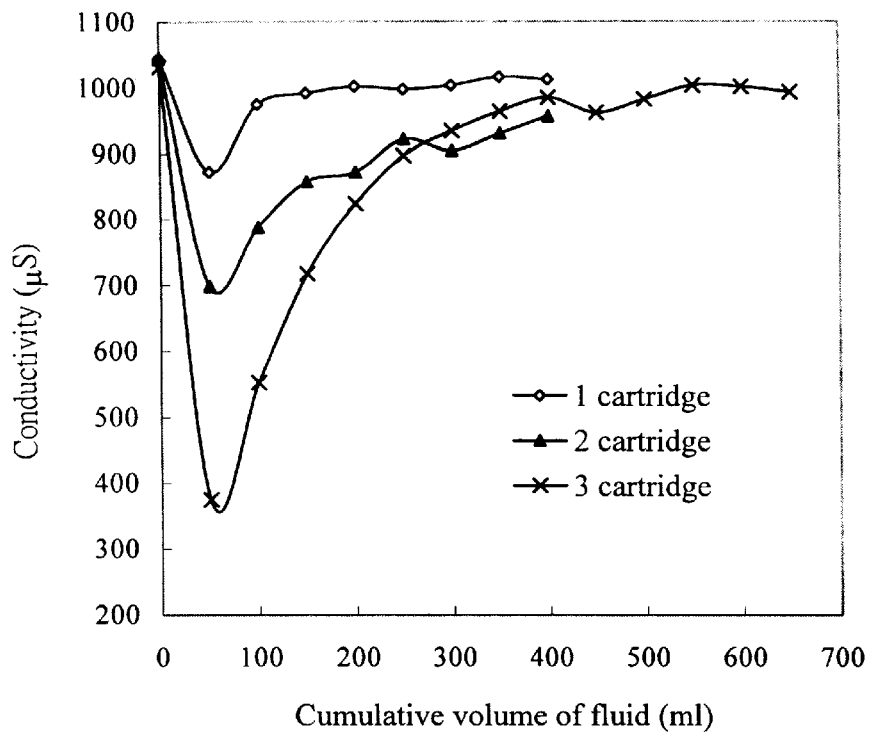

FIG. 5A illustrates the conductivity of every 50 ml collection of effluent of a NaCl solution flowing through setups containing 1, 2 and 3 flow-through capacitors; 5B illustrates the amount of ions removed in the first 50 ml collection of the FTCs containing 1, 2 and 3 flow-through capacitors, respectively.

DETAILED DESCRIPTION OF THE INVENTION

Water crisis is a current or an imminent affair to many areas in the world. As far as the contaminants in waters and other liquids are concerned, heavy metals and charged species are the major pollutants. Being soluble in liquids, they are grossly characterized as total dissolved solids (TDS) and expressed in ppm. In many occasions, as TDS of a liquid is reduced to a certain level of ppm, the "contaminated" liquid will become useful. For example, the TDS of seawater is virtually 35,000 ppm everywhere, seawater, however, is suitable for irrigation purposes when TDS is reduced to 500 ppm. If TDS of the same water is lower than 200 ppm, it becomes potable without a salty taste. Removal of TDS is the result of desalting or deionization, which is most conveniently accomplished by applying an electrostatic field using a capacitor configuration. Simple ions and charged complex species are drawn instantaneously to the electrodes under the application of a DC voltage. Charged species remain on the surface of electrodes as long as a DC voltage is present. Obviously, the larger the adsorbing area, the more ions are adsorbed and removed from the feed liquids. However, upon the termination of the electrical application, most of the detained contaminants are released, and a complete regeneration only requires a quick reversion of the polarities of the electrodes. In other words, electricity is employed for both deionization and regeneration. This is one advantage of CDI over the ion-exchange technique, the most popular way of desalting. As the latter demands chemicals for regenerating resins, a secondary contamination is resulted.

Figure 1:
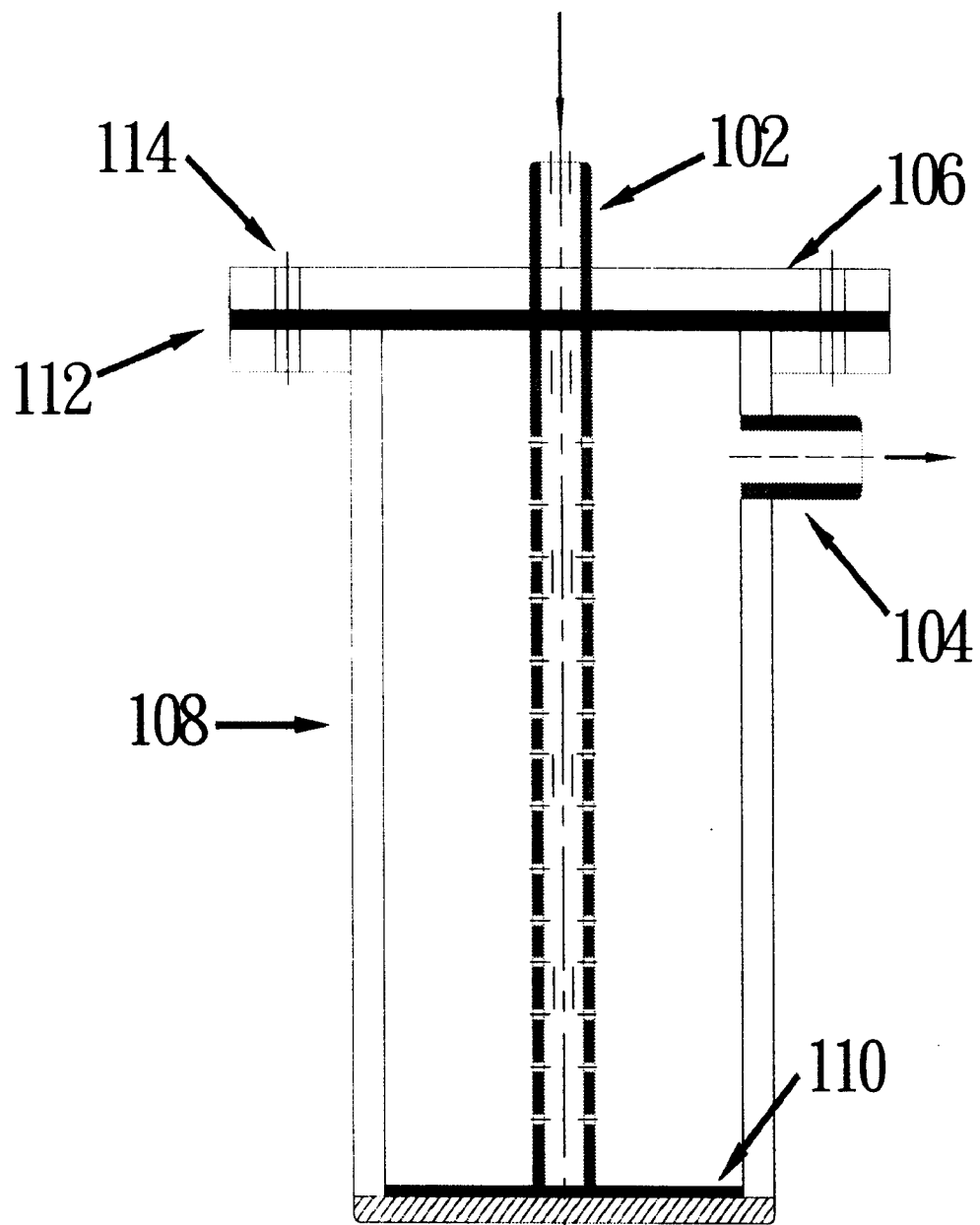
FIG. 1 is a cross-sectional view of the inlet and the outlet of liquid inside a CDI (capacitive deionization) cartridge holder for a flow through capacitor (FTC).

The instant invention applies a proved active material of supercapacitors for preparing the ion-adsorbing electrodes for CDI. In order to attain as large a surface area as possible for the electrodes, nanopowders of ferrites, such as the black magnetite ($Fe_3O_4$) and its composites, are prepared using a sol-gel technique or electrolysis. Based on capacitance measurements and other tests, the qualified powders are converted into electrodes for constructing rolls of flow through capacitor (FTC). Together with a liquid feeding pipe, FTC is placed in an enclosed container to form a CDI treating unit. FIG. 1 shows the cross-sectional view of a liquid input and a liquid output inside the housing holder where FTC is omitted for the ease of an illustration. This is similar to the housing holders for containing packages of adsorbing/filtering carbons, ion-exchange resins and RO membranes. Both the liquid inlet pipe 102 and the holder body 108 can be constructed by injection molding using engineering plastics such as acrylics, polycarbonate. PVC, PE or FRP. After liquid radiates from the perforation of the central pipe 102, it will travel through the whole length of electrodes of the FTC before exiting the holder via the outlet 104. Liquids are directed to flow transversely and outwardly over every inch of accessible surface area of electrodes, hence, the contact time between the charged species and the electrodes of FTC is enhanced. As the treated liquids use the longest path of FTC, charged species can be most efficiently adsorbed. Liquid leaks are prevented by attaching the holder cap 106 to the holder 108 with the compression of gaskets 110 and 112. The holder cap 106 is molded using the same material as that for 102 and 108, while gaskets 110 and 112 are made of neoprene, butyl rubber or silicone rubber. Holes 114 are drilled around the cap 106 and on the brim of the holder 108 for securing bolts and nuts. In another embodiment, both the cap 106 and the holder 108 can be threaded to fit each other for hand tightening. The formation of a FTC package and the generation of liquid channels are elaborated, respectively, in the subsequent paragraphs.

Figure 2:
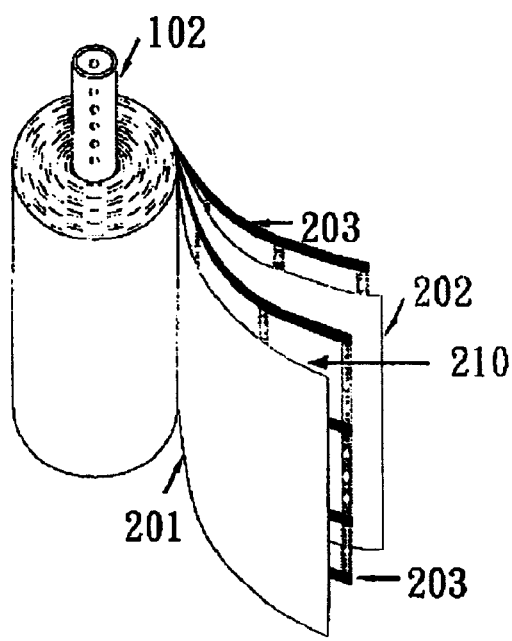
FIG. 2 is a perspective view of a concentric winding of electrodes and dividers into a capacitor roll. Liquid inlet pipe can be inserted to the center of roll.

FIG. 2 shows one preferred embodiment of the structure of a FTC package in which two electrode sheets, 201 and 202, and two identical divider sheets 203 are concentrically wound into a roll with an opening at the center of the roll. The fabrication of the said FTC packages is easily automated with winding machines that are commonly used in the capacitor and battery industry. Sheets of electrode and divider in desired widths can be continuously fed to the machine for winding into a roll of a desired diameter. After the roll is cut and secured with a tape, a free-standing FTC package is formed. Actually, the FTC package is a supercapacitor without electrolyte and a housing case. Once the electrodes are cut, a current collector is exposed and burs are formed as well, which may cause electrical short and other harms to the FTC package. Therefore. rectifying procedures such as de-bur and passivation should be taken. The central opening of FTC package is made to fit the liquid feeding pipe 102 with a desirable outer diameter (OD) and inside diameter (ID), for example, an OD greater than 6 mm and ID greater than 5 mm, respectively. As seen in FIG. 2, holes, for example 1/16" diameter, are evenly distributed at about 1/16" apart on opposite sides of the feeding pipe 102. Depending on the desirable handling capability of FTC package, the dimensions of the pipe 102, in terms of OD and ID, as well as the diameter and number of perforated holes for the feeding liquids can be adjusted accordingly. The CDI housing holder 108 and the feeding pipe 102 should be insulated from the FTC package. No electric communication should exist between the capacitor and the holder. Electrodes 201 and 202 are prepared by coating a conductive metal foil such as aluminum, copper, titanium, stainless steel or nickel by an active material, such as, magnetite ($Fe_3O_4$) or its composites using various deposition methods, wherein the active material has a conductivity of no less than $10^{-2}$ Siemen/cm and a mangnetic flux density of no less than 10 Gauss. All deposition methods in forming the electrodes, for example, roller coating, dip coating, spin coating, power coating or electrophoretic deposition, can be easily automated as well. If a coating method, for example, such as roller coating, is used, the aforementioned powders are mixed with a binder, for example, polyvinylidene fluoride (PVDF) or polytetraethylene fluoride (PTFE), in a suitable solvent to form a coating paste. While identical electrodes are used for fabricating the FTC packages, their polarities are determined by the manner of connection between the electrodes and an outer power supply. Either electrode 201 or 202 can be the anode by connecting to the positive pole of a power supply, the other electrode 202 or 201 then becomes the cathode. Either arrangement makes no difference to the deionization performance of a FTC package. As known to those skilled in the art, the substrate foil carrying the ion-adsorbing material also conducts electrons, it is thus named as a current collector. The current collector will not improve the conductivity of the ion-adsorbing material, but it will affect the power consumption and the lifetime of the FTC. Though it is not shown in FIG. 2, electric leads can be tabs of the substrate foil, or can use other metallic pins spot welded or mechanically crimped to the current collector. Neither the current collector nor the electric leads should be in direct contact with the feed liquids, otherwise chemical reactions may occur and the efficiency of CDI is impaired.

Figure 3:
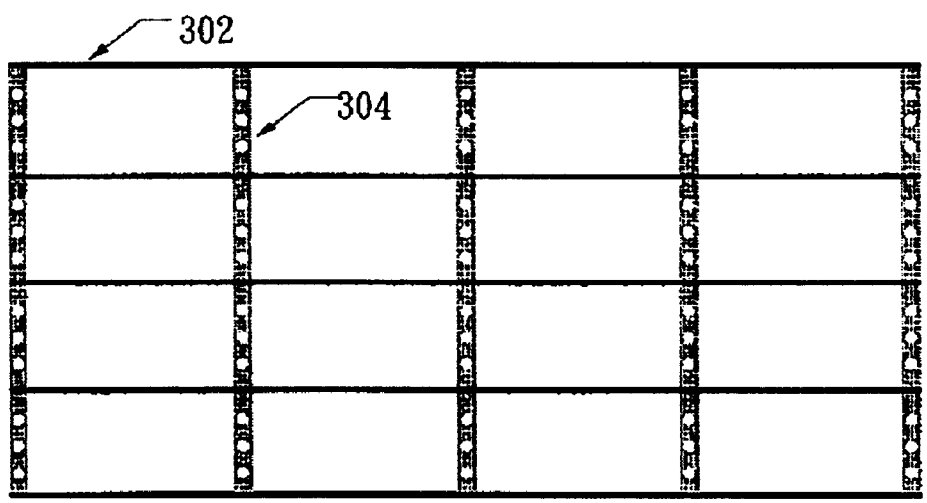
FIG. 3 is a pattern of molded divider with vertical porous supports and horizontal strips, and the latter confines liquid and defines liquid flow within the FTC.

One embodiment to form liquid channels inside the FTC packages is illustrated in FIG. 3. A molded divider comprising horizontal strips 302 and vertical supports 304, where the strip 302 is thicker than the support 304, for example, 1 mm vs 0.1 mm, is used to guide the liquid flow inside the FTC. The horizontal strips 302 are made in a shape of rectangular bands having the dimensions of about 0.5 mm to 1 mm in height and about 1 mm in width. The middle strips are about 30 mm apart. The distance between the top strip and the bottom strip is slightly lower than the height of the electrodes, for example, 2 mm off the height of the electrodes. The vertical supports 304 can be of any width that is sufficient to support the strips 302 with a minimal coverage of the electrode surface. The vertical supports 304, which are at least 30 mm apart, have a width of about 2 mm and a thickness of about 0.1 mm. With the dividers 203 closely interposed between the electrodes 201. 202 (as shown in FIG. 2), the top and bottom strips of the divider, which are leveled with the edges of the electrodes, will confine liquids within the FTC package, whereas the middle strips create multiple transverse channels 210 of about (0.5 to 1) mm×30 mm space for liquid flow under virtual zero restriction. Once the liquid radiates from the feeding pipe 102 (as shown in FIG. 1), it will flow horizontally and outwardly within the defined channels. Following the channels, liquid will run over all accessible surface area of the electrodes. Since the supports 304 take up a significant amount of the surface area of the electrodes, holes are made on the supports to compensate the area loss. Nevertheless, the capacitance of capacitors is determined by the distance between electrodes. As smaller gap yields a higher capacitance on one hand, it produces a greater restriction to liquid-flow on the other. The thickness of the dividing strips is thereby a balance between capacitance and liquid-flow resistance. The electrode gap can vary from 0.3 mm to 1 mm, or preferably from 0.5 mm to 1 mm. Another embodiment of fabricating the dividing strips without the vertical supports is to use stencil-printing of 1 mm×1 mm bands of an elastic polymer such as silicones, rubbers or polyurethane longitudinally across the electrodes. Integration of the dividing strips with the electrodes can simplify the fabrication process of FTC packages. In the present invention, either molded or printed dividers will perform three tasks: 1) providing an insulation to the electrodes to prevent electric shorts, 2) confining fluids within the FTC packages, and 3) defining a fluid flow path inside the FTC packages. In addition to flexibility, the polymeric material used for constructing the dividers for the FTC packages should be robust and resistant to contaminants including acids, bases, salts, organic materials, and microorganisms that may be present in the feed liquids.

Figure 4:
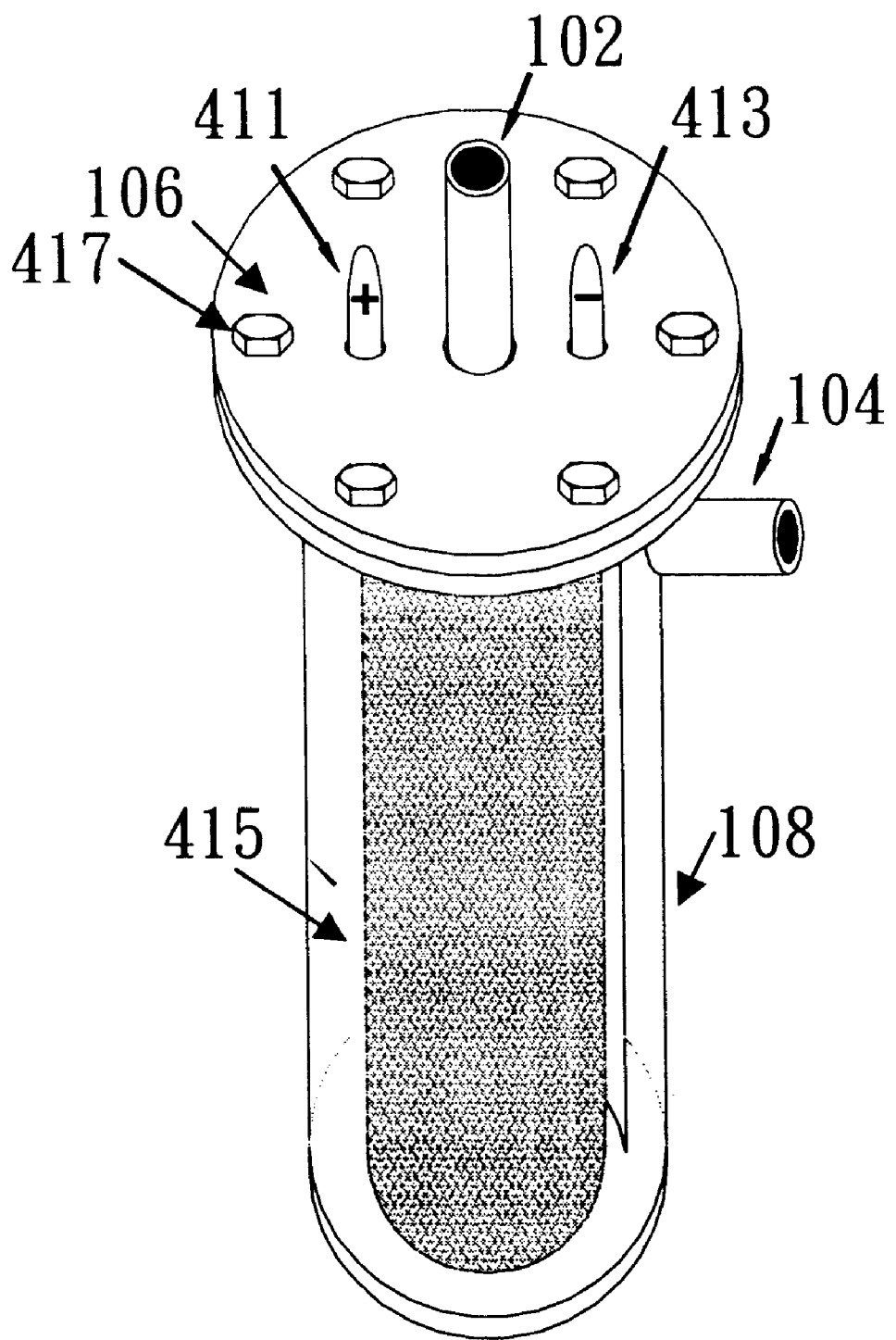
FIG. 4 is a top view of a CDI cartridge showing the liquid inlet and outlet, the outer electric leads, as well as the package of a FTC.

FTC is the heart of the CDI technique for liquid purification and desalination. If CDI ever becomes a popular technology as filtration, ion-exchange and reverse osmosis for used in waste liquids treatment, the use of the FTC should be as convenient as its competitive counterparts in the better known technologies, which are generally packed in cylindrical forms and are replaceable. The general rule of thumb is the use of a replaceable component in any waste-liquids treating method should be as easy as changing light bulbs or batteries. The FTC package of the present invention as described in the previous paragraphs is designed to fulfill the above requirement. Though the FTC package can stand-alone and perform waste liquids treatment independently, it is better used in conjunction with a holder as shown in FIG. 4. FIG. 4 is a top view of the holder as that shown in FIG. 1, thus the same reference numbers are used for the common parts. As seen in FIG. 4, a replaceable FTC package 415 is enclosed in the holder body 108 by six nuts 417 on the holder cap 106. Another sealing method is to construct engaging threads on the cap 106 and the holder 108 to allow the setup to be closed by hands. There are two electric pins 411 and 413 atop the holder cap 106 for connecting to a power supply, for example, dry battery, a fuel cell or a solar cell. An electrical connection between the electric pins 411 and 413 and the electrode leads (not shown in Figure) of the FTC package 415 can be completed by snap-on connectors. Waste liquids are fed to the holder 108 through the inlet 102, and liquids are directed to flow through the FTC 415 in a longitudinal manner before exiting the holder through the outlet 104. There is no direct communication between the inlet 102 and the outlet 104. Liquid has to flow through the entire length of the capacitor before reaching the outlet 104. From time to time, only the FTC package 415 needs to be replaced, other components can be used indefinitely. Because both inorganic and organic aqueous solutions are employed as electrolytes in the supercapacitors, the FTC packages are capable of removing ionic species from all kinds of waste-liquid, regardless the waste liquid is an inorganic or organic aqueous solution, so long as ions are present in the liquids. Based upon the desirable throughput of CDI, the dimension of the FTC package 415, which is measured by its diameter and height, can be fabricated accordingly. Black magnetite powders or its composites have been employed in a preferred embodiment of the present invention to construct the FTC packages 415 having a dimension of about 60 mm×150 mm for developing commercial models of FTC to be used in TDS reduction by CDI. A key feature of the present invention is to allow the treated liquids to flow through the longest path of the FTC package so that all the effective surface area of the electrodes of FTCs are utilized for adsorbing the charged species. The highest throughput rates of deionization can thus be achieved. Several experimental data are cited below only to demonstrate, rather than limiting, the present invention in offering an economic and user-friendly CDI technique for liquid purification and desalination.

Example 1

FTCs are constructed by roller-coating a homogeneous paste of hydrated iron compound, which is prepared in-house, on aluminum foils with the dimension of 150 mm×490 mm×0.1 mm. The paste is based on the following formulation:

1 g $Fe_3O_4$ and 0.03g PVDF [poly(vinylidene fluoride) are mixed with 1.5 ml NMP (N-methyl-2-pyrrolidone) and homogenized After the solvent, NMP, is evaporated by an IR-light illumination or other heating means, electrodes and dividers are wound into a roll of FTC as shown in FIG. 2. Two tabs from the same foils of anode and cathode are used for electric connection to a DC power source. With the liquid-feeding pipe 102 inserted into the center of the roll, the FTC is placed in a plastic holder body 108, wherein an inside diameter of the holder body 108 is 60 mm and a height is 150 mm. Then, the holder 108 is sealed by securing the cap 106 to the body 108 using bolts and nuts, while the two taps are extended to the outside of the holder 108. A combination of the FTC and the housing holder as assembled is termed as a cartridge. A single cartridge, or a multiple of cartridges connected in series. is employed for deionizing the various liquids as described below.

Liquid: NaCI aqueous solution with a conductivity of 1040 $\mu$S

Voltage: 1.0 DC Volt

Liquid flow rate: 50 ml/min

Number of cartridge: 1, 2 and 3

Figure 5B:
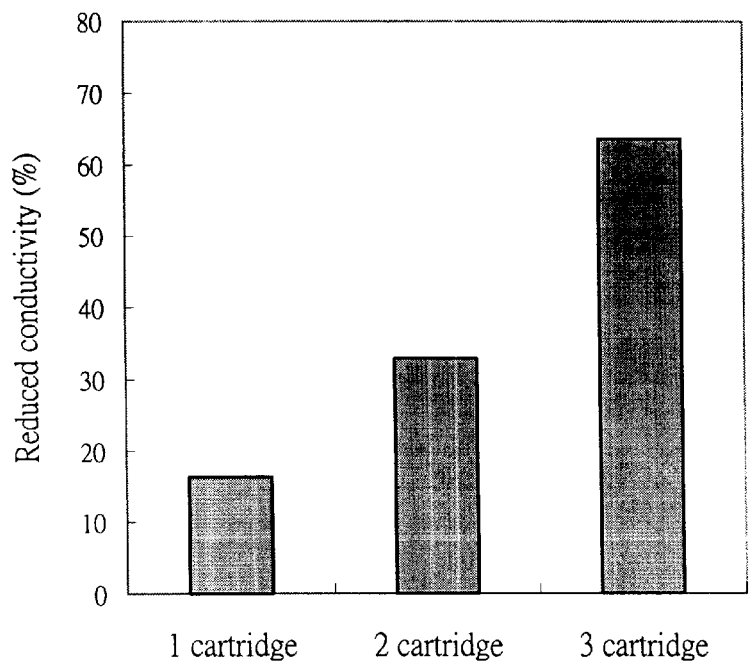

The effluent is collected for every 50 ml followed by a measurement with a conductance meter. The conductivities of the first 50 ml collection for 1, 2, and 3 cartridges are measured as 842 $\mu$S, 676 $\mu$S and 385 $\mu$S, respectively, which represent a 19%, a 35% and a 63% deionization or removal of ions for each set of the FTC assembly. FIG. 5B lists the amount of ions removed as the fluid only flows through each set of the FTC assembly, while FIG. 5A shows the fast increase of conductivity in the later portions of the effluent collected, indicating that the electrode surface of the FTCs is quickly occupied. Nevertheless, the effluent never reaches the concentration level of the feedstock. If CDI is the sole technique available for removing charged species in liquid treatments, the size and the number of FTC can be custom-made to meet the requirements. The manner of liquid-flow in the CDI system can also be meticulously arranged to attain the desirable goals.

Example 2

Using deionized water, the used FTCs from experiment 1 are flushed till the effluent showing low conductivities (in single digits of $\mu$S). The regenerated FTCs are then applied in the following test.

Liquid: $CuSO_4$ aqueous solution with conductivity of 1420 $\mu$S

Voltage: 1.0 DC Volt

Liquid flow rate: 50 ml/min

Number of cartridge: 2

The conductivity of the first 50 ml collection of effluent is measured as 724 $\mu$S indicating a 49% removal of ions as the fluid simply flows through the capacitors under a very low voltage.

Example 3

Similar method of regeneration as example 2 is used to prepare FTCs for desalination. Seawater is obtained from a creek to the Pacific Ocean at the west coast of Taiwan. In compliance with the measuring limit of our conductance meter, the sample is diluted 50 times using deionized water. It is estimated that the sample has a TDS (total dissolved solids) of 20,000 ppm. Without any further pre-treatment, the diluted liquid is deionized as follows.

Liquid: diluted seawater with conductivity of 793 $\mu$S

Voltage: 1.0 DC Volt

Liquid flow rate: 50 ml/min

Number of cartridge: 2

The conductivity of the first 50 ml collection of effluent is measured as 619 $\mu$S, accounting for a 21% removal of ions. Comparing to the same number of cartridge in example 1, the current case appears to be inferior in deionization. This is probably due to a more complex composition in seawater than that in a NaCI solution.

Example 4

A composite powder, $Fe_3O_4/C$, is made by incorporating activated carbon in the amount equivalent to 20% by weight of $Fe_3O_4$, which can be synthesized in a batch, with the starting materials for a sol-gel preparation. As in example 1, paste of the composite powder is formulated to fabricate the FTC and assembly for purification of a brine water.

Liquid: NaCI aqueous solution with conductivity of 1082 $\mu$S

Voltage: 1.0 DC Volt

Liquid flow rate: 50 ml/min

Number of cartridge: 1

The conductivity of the first 50 ml collection of effluent is measured as 779 $\mu$S, representing a 28% removal of ions as the fluid merely flows through the single capacitor. As the activated carbon provides more surface area than $Fe_3O_4$ does, FTC yields a higher deionization rate from using the composite than the straight metal oxide. Such observation is consistent with the theory of energy storage of supercapacitors. From the aforementioned examples, it is obvious that the present invention is a viable tool for liquid purification and desalination. With economic materials and easy fabrication, CDI using the present invention can be added to the list of techniques frequently used in pollution control and environment protection.

What is claimed is:

1. A free-standing flow-through capacitor, comprising:

a first electrode, the first electrode comprises an active material and an electronically conductive foil, wherein the active material and the electronically conductive foil are integrated into a first flexible monolithic sheet;

a first divider disposed on the first electrode;

a second electrode disposed on the first divider, the second electrode comprises the active material and the electrically conductive foil, wherein the active material and the electronically conductive foil are integrated into a second flexible monolithic sheet; and a second divider disposed on the second electrode, wherein the first electrode, the first divider, the second electrode and the second divider are wound concentrically into a hollow-center roll with a center opening, wherein said first and second dividers are sheets with pattern containing horizontal strips and vertical porous supports, wherein the horizontal strips are thicker than the vertical supports, so that said divider provides a gap between the electrodes in the roll assembled.

2. The flow-through capacitor in accordance with claim 1, wherein said center opening allows an insertion of a liquid-feeding pipe with an outside diameter greater than 6 mm, and an inside diameter greater than 5 mm, wherein the feeding pipe has holes arranged evenly on opposite sides of the pipe to deliver fluids to the flow-through capacitor.

3. The flow-through capacitor in accordance with claim 1, wherein said divider is a sheet with a pattern containing horizontal strips of 1 mm in width and about 0.5 mm to about 1.0 mm in height, which are inter-connected by vertical porous supports with a width of about 2 mm and a thickness of about 0.1 mm, wherein a distance between a top strip and a bottom strip is about 2 mm off a height of the first and the second electrodes, while middle strips are separated at a space of less than 30 mm, and a spacing between the vertical supports is greater than 30 mm.

4. The flow-through capacitor in accordance with claim 1, wherein said divider guides fluids to flow transversely and outwardly through an entire length of the electrodes of the flow-through capacitor so that the fluids use a longest path in the flow-through capacitor before exiting the capacitor.

5. The flow-through capacitor in accordance with claim 1, wherein said divider is formed by stencil printing horizontal strips of 1 mm in width and 0.5 mm to 1.0 mm in height directly on the electrodes.

6. The flow-through capacitor in accordance with claim 1, wherein said active material includes a hydrated iron compound having a chemical composition of $Fe_xO_yH_z$, where $1.0 \leq x \leq 3.0$, $0.0 \leq y \leq 4.0$, and $0.0 \leq z \leq 1.0$.

7. The active material in accordance with claim 6, wherein said $Fe_xO_yH_z$ is $Fe_3O_4$.

8. The flow-through capacitor in accordance with claim 1, wherein said active material is a composite compound containing $Fe_3O_4$ and other component of the composite compound is selected from the group consisting of activated carbon, graphite, tin oxide, zinc oxide and titanium oxide.

9. The flow-through capacitor in accordance with claim 1, wherein said active material has a conductivity of no less than $10^{-2}$ Siemen/cm.

10. The flow-through capacitor in accordance with claim 1, wherein said active material has a magnetic flux density of no less than 10 Gauss.

11. The flow-through capacitor in accordance with claim 1, wherein said electronically conductive foil is selected from the group consisting of aluminum, copper, nickel, stainless steel and titanium.

12. The flow-through capacitor in accordance with claim 1, wherein said electrodes are prepared by roller coating, dip coating, spin coating, powder coating, or electrophoretic deposition of the active material on the electronically conductive foil.

13. The flow-through capacitor in accordance with claim 1, wherein said electrodes adsorb ionic species on a surface of the electrodes and perform deionization of liquids upon an application of a voltage to the electrodes.

14. The flow-through capacitor in accordance with claim 1, wherein said electrodes adsorb ions by an electrostatic attraction using a DC voltage of less than 1.0 volt, which is provided by a power supply, dry batteries, secondary batteries, fuel cells, or solar cells.

15. The flow-through capacitor in accordance with claim 14, wherein the DC voltage is provided by a power supply, dry batteries, secondary batteries, fuel cells or solar cells.

16. The flow-through capacitor in accordance with claim 1, wherein said electrodes depend on a double-layer capacitance for adsorbing charged species contained in feeding liquids.

17. The flow-through capacitor in accordance with claim 1, wherein the first electrode is an anode and the second electrode is a cathode by connecting the first electrode to a positive pole of a power supply and the second electrode to a negative pole of the power supply.

18. The flow-through capacitor in accordance with claim 1, wherein the second electrode is an anode and the first electrode is a cathode by connecting the second electrode to a positive pole of a power supply and the first electrode to a negative pole of the power supply.

\* \* \* \* \*